C. F. BURGESS.
DRY CELL AND BATTERY THEREOF.
APPLICATION FILED MAY 28, 1915.
1,188,408.
Patented June 27, 1916.
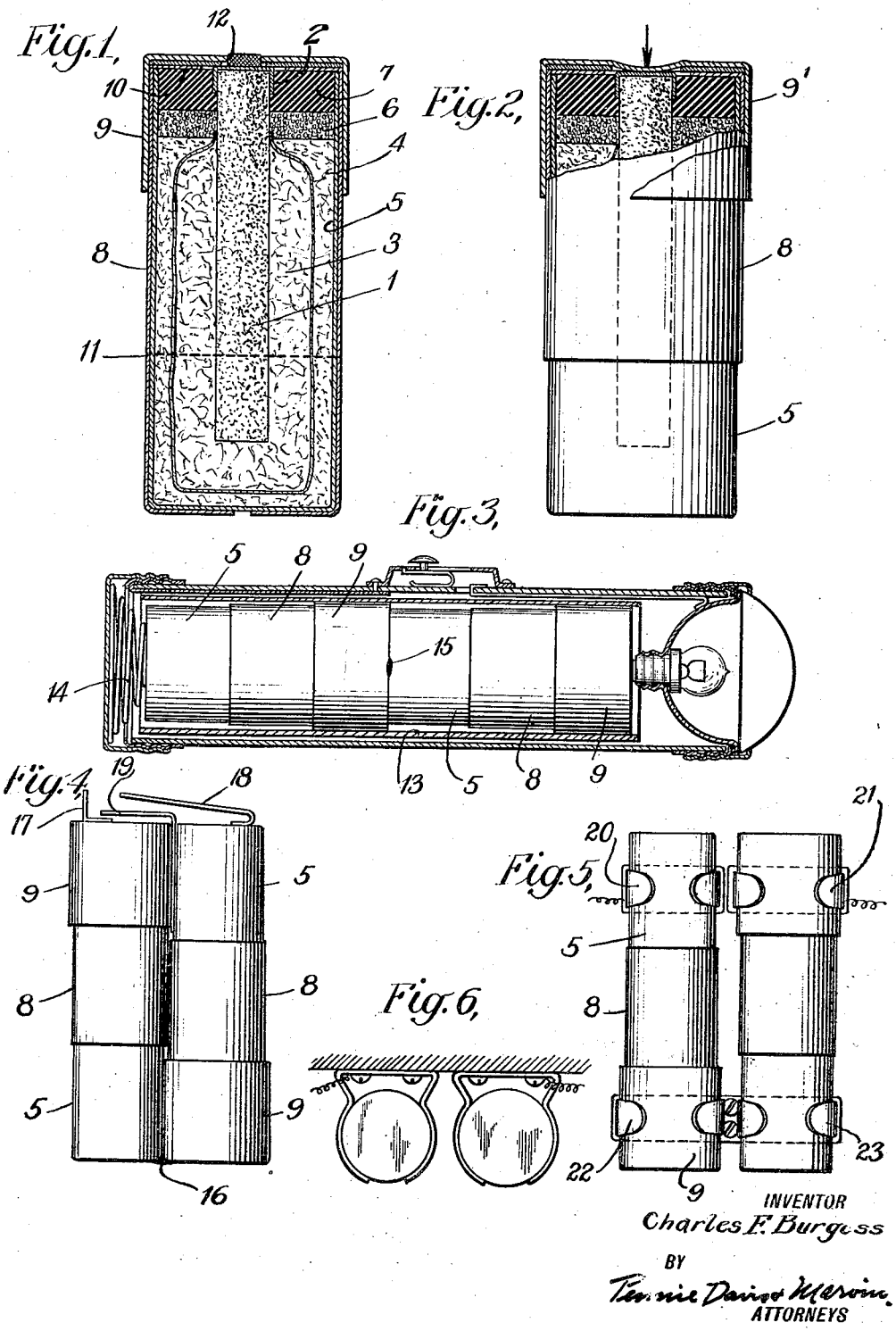
INVENTOR
Charles F. Burgess
BY
Tennie Davis Merwin
ATTORNEYS

UNITED STATES PATENT OFFICE.

CHARLES F. BURGESS, OF MADISON, WISCONSIN, ASSIGNOR TO C. F. BURGESS LABORATORIES, A CORPORATION OF WISCONSIN.

DRY CELL AND BATTERY THEREOF.

1,188,408.  Specification of Letters Patent.  Patented June 27, 1916.

Application filed May 28, 1915. Serial No. 30,963.

*To all whom it may concern:*

Be it known that I, CHARLES F. BURGESS, a citizen of the United States, residing in Madison, county of Dane, State of Wisconsin, have invented certain new and useful Improvements in Dry Cells and Batteries Thereof; and I do hereby declare the following to be a full, clear, and exact description of the invention, such as will enable others skilled in the art to which it appertains to make and use the same.

The present invention relates to dry cells suitable for use in flash lights and battery hand lamps, and relates more particularly to adjuncts whereby the cells are protected from mechanical injury and are safeguarded in many ways, and whereby the danger of short-circuiting is lessened and a convenient and effective grouping of the cells into batteries is made possible.

In dry cells as ordinarily constructed, the carbon or electronegative electrode extends up through a pitch seal at the top of the cell, and carries a brass cap to which electrical connection may be made either by pressure contact or by soldering. This is a fragile construction because the carbon rod is itself relatively weak, and the pitch seal is brittle and easily broken, resulting in leakage of the electrolyte or drying out of the active battery material. It sometimes happens that when the cells are dropped or otherwise abused, the carbon electrode will be forced down through the pitch seal, thereby destroying the effectiveness of the seal and otherwise impairing the cell. This may happen when the cell is used in a hand lamp and is squeezed too tightly between the base of the lamp bulb and the screw cap with which such devices are commonly provided. There is also a tendency for the seal to be pushed upward because of the generating of gases in the cell while in action, or even when on the shelf, and such a movement of the pitch seal will permit leakage of the electrolyte or creepage of salts, and eventually will result in early destruction of the cell.

It is the object of the present invention to provide a cell in which the causes of failure above set forth are in large measure removed, and in which various other advantages are insured, more particularly with reference to convenience in handling and in assembly into groups or batteries.

To attain these objects, I make use of a metal collar or cap slipped on over the zinc electrode of the cell but insulated therefrom, and I arrange this cap so that connection may be made therethrough to the carbon or electronegative element of the cell, as hereinafter explained more at length. This arrangement protects the pitch seal, insures good connection with the carbon electrode, facilitates assembly, and is in many ways advantageous as hereinafter set forth, or apparent to those skilled in this art.

In the accompanying drawings, Figure 1 is a sectional elevation through a cell provided with a metal cap soldered to the terminal of the carbon electrode. Fig. 2 illustrates a modification wherein the metal cap is not soldered to the carbon terminal but is elastic enough to move into contact therewith under pressure. Fig. 3 shows one way of grouping such cells end to end, as for use in a hand lamp. Fig. 4 shows the cells arranged side by side and connected in series. Fig. 5 shows the cells held in spring clips through which connection is made. Fig. 6 is a top view of the arrangement shown in Fig. 5.

In Fig. 1, the cell comprises a carbon rod 1 provided at its top with a brass cap 2 squeezed on the carbon rod in usual manner to serve as a terminal for contact devices. About the carbon rod is a depolarizing mixture 3 of manganese dioxid rendered conductive by carbon or graphite and mixed with the usual salts. Inclosing the core of depolarizing mixture is the electrolytic paste 4 held in the usual zinc cup 5, which serves not only as the electropositive electrode of the cell, but also as a container for the other elements. Above the electrolyte paste 4 is an air space or porous separator 6 to take care of gases developed in the cell, and above this is the usual pitch seal 7, the top of which may be substantially flush with the edge of the zinc electrode, with the brass cap 2 projecting slightly above the pitch. The foregoing elements may vary in detail, but it is with cells of this general character that my invention has been used to best advantage.

In accordance with the present invention, I inclose a part or all of the zinc container in a wrapping 8 of paper, or equivalent insulating material, and over this wrapping I slip a metal cap 9. This metal cap may be of thin sheet brass shaped in the form of a cup, and preferably is of such size that when forced over the top of the cell it will frictionally engage the paper wrapping and grip it tightly. I prefer that the paper wrapping shall be folded in over the edge of the zinc container or electrode, about as shown in Fig. 1, so that the edge of the zinc or irregularities thereon may not come into contact with the brass cap. Preferably, a paraffined paper washer, 10, or equivalent insulating material, lines the cup to assist in preventing short-circuit or leakage to the cap. The paper wrapping may extend down the entire length of the zinc container and may be folded over or crimped to cover up the bottom of the can, though it is often desirable to perforate the paper at about the dotted line 11 so that the lower portion of the wrapping may be stripped off to give access to the zinc beneath.

In the modification shown in Fig. 1, there is a hole through the cap 9 at its center through which a drop of solder 12 may be introduced to permanently connect the cap to the carbon electrode.

With the arrangement above described, the cells can be handled in the factory without the same danger of short-circuiting as is found with ordinary types of cells. The paper wrapping 8 may be waterproofed before being applied to the zinc, but I prefer to waterproof it after the device has been completely assembled, as above described, for in that condition the complete cell can be dipped into melted paraffin, thereby not only making the entire paper wrapping waterproof and increasing its insulating characteristics, but also giving to the metal cap 9 a thin coating advantageous in preventing tarnishing and similar deterioration. The dipping in hot paraffin has a tendency to soften the pitch seal 7 because of the heat, but this is advantageous rather than otherwise, for if the pitch melts or softens sufficiently, it will become attached to the adjacent paper and thereby stiffen and strengthen the seal as a whole. The hot paraffin runs up by capillarity under cap 9, and at a proper temperature a thorough impregnation of the paper and a thorough coating of the entire cell is possible. This cannot be done with the ordinary cell because of the danger of softening or melting the pitch seal.

Although the metal cap is held in place mainly by the frictional hold it has on the paper covering 8, it is not so tightly held but that it will yield to some extent if for any reason the pressure inside the cell should become too high. It can move upward a little to relieve excess pressure without moving the carbon rod because the cap is thin and somewhat flexible; but whether the carbon rod does or does not move when the excess pressure forces the cap upward, the cell does not become unsealed in a practical sense, for the electrolyte cannot escape and substantial evaporation cannot occur. In other words, the volume of the cell may increase in an emergency and the cell will remain in good condition, and be able to continue in use for substantially its normal life.

The waterproofed paper wrapping, particularly if it covers substantially the entire surface of the zinc container, prevents leakage of the cell contents when the zinc has become perforated or corroded either because of normal use or because of some imperfection in the cell permitting local action, and the paper thereby prevents corrosion of the metal casing in which such cells are often used, and also prevents evaporation and drying out of the cell, and is of value in the factory while the cells are being handled or assembled into batteries or are in storage. It is easy to solder an electrical connection to the metal cap 9, easier than if the connection were to be made to the terminal cap 2, and the cap 9 covers up the pitch and holds it and the other sealing compound in place. Electrical connection can be made to the zinc, as through a perforation in the paper wrapping, or by soldering to the zinc after locally stripping off the paper. By stripping away the paper wrapping below the line 11 of perforation, as when the cells are to be assembled into batteries, the lower part of the zinc shell becomes exposed, as shown in Fig. 2, and is available for completing connections to the cell.

In the modification illustrated in Fig. 2, wherein the parts are numbered to correspond with Fig. 1, the metal cap 9', though it may have a central hole, has no soldered connection with the carbon rod, but is crowded on to the cell only far enough to bring it close to the rod cap 2, but without touching. By making the cap of thin material, as of sheet brass, the flexibility of the metal will permit it to move down under end pressure, applied as indicated by the arrow, into contact with cap 2, and therefore into electrical connection with the carbon rod. This connection may be permanent or but temporary, depending on the flexibility and thickness of cap 9' and the uses to which the cell is to be put.

In assembling into batteries the cell illustrated in Fig. 2, or the cell of Fig. 1, after stripping away the paper below line 11, I may place them end to end, as shown in Fig. 3, or side by side, as shown in Fig. 4. In using them end to end, as shown in Fig. 3, particularly when using them in a hand lamp of the general character disclosed in that figure, I prefer to inclose the cells in a tube 13 of pasteboard or the like. The thrust of spring 14 in the bottom of the hand lamp maintains connection throughout the series, whether two or more cells are used, but I prefer to solder the zinc of one cell to the metal cap 9 of the next, as indicated at 15, for this reduces the contact resistance between the cells and overcomes the danger of open-circuiting through corrosion, and in dealing with the small voltages here under consideration, these are important factors in the efficient operation of the hand lamp.

When the cells are to be arranged side by side for series connection, I arrange the exposed zinc bottom of one cell adjacent to the metal cap of the next, and I connect the zinc to the cap either by simple contact or by means of a drop of solder 16 applied to their adjacent sides, or I may use other special means for connecting, as explained hereinafter in connection with Figs. 5 and 6. With this arrangement, as shown in Fig. 4, an L-shaped metal strip 17 may be soldered to one metal cap and a yielding metal strip 18 of usual form may be soldered to the exposed zinc bottom of the cell next adjacent, and a thin strip 19 of fiber or the like may be inserted between the upper portions of the two cells to prevent them from making contact and thus short-circuiting, and the battery thus assembled may be placed in a suitable container or carton and is ready for use in the well known type of electric flash light.

In the arrangement shown in Figs. 5 and 6, the cells are slipped into spring clips such as are used for holding fuses. The upper metal clips 20 and 21 may be connected with the circuit to be supplied with current from the battery, and the lower clips 22 and 23 may be connected together to form a crossconnection, it being understood that these clips are permanently mounted on some sort of a supporting wall indicated diagrammatically in Fig. 6. The cell inserted between clips 20 and 22 has its naked zinc bottom 5 contacting with clips 20, and its metal shell 9 contacting with clips 22, and the adjacent cell has the reverse arrangement so that the cells may act in series. It will be understood that any desired number of cells can thus be arranged side by side in series connection to give a battery of the desired voltage. In case any cell becomes impaired or exhausted, it can be slipped out of its clips and replaced by a fresh cell, and there is no occasion for making or breaking any soldered connections, and the arrangement as a whole is very convenient and has many advantages, as will be understood by those skilled in the art.

I claim:

1. A dry battery cell having a zinc element, and a metal cap which is slipped over said zinc element and permanently insulated therefrom and through which connection may be established with the carbon or electro-negative element of the cell, substantially as described.

2. A dry battery cell having a zinc element, and a metal cap slipped over said element and permanently insulated therefrom, said cap being electrically connected with the carbon element, substantially as described.

3. A dry battery cell having a zinc element, a metal cap slipped over said element and permanently insulated therefrom and means connecting said cap with the carbon element of the cell.

4. A dry battery cell having a perforate metal cap slipped over and insulated from the zinc element and a soldered connection between said cap and the terminal of the carbon element of the cell.

5. A dry battery cell having a zinc electrode with an end portion permanently insulated, a metal cap inclosing said insulated end portion of the zinc electrode, said cap being held from free longitudinal movement by frictional engagement with said insulated end portion and establishing electrical connection with the carbon electrode, substantially as described.

6. The combination of a dry cell, an insulating covering for a part at least of the zinc element of said cell, a metal cap snugly fitting over said insulation, said cap making electrical connection with the carbon or electronegative element of said cell and serving as a cell terminal.

7. The combination of a dry cell, an insulating covering for a part only of the zinc element of said cell, a metal cap tightly fitting over said insulation and electrically connected with the carbon element of said cell, a portion of said zinc electrode outside of said cap being exposed for electrical contact.

8. The combination of a dry cell, a paper wrapping about the upper part at least of the zinc electrode, a metal cap covering the top of said cell and tightly engaging said paper wrapping, said cap at its center being soldered to the terminal of the carbon electrode of said cell.

9. The combination of a dry cell, a paper wrapping about the upper part of the zinc electrode, said wrapping overlapping the edge of the zinc, a metal cap covering the seal of the cell and tightly gripping said wrapping, said cap having a central perforation, and solder in said perforation electrically connecting the cap to the terminal of the carbon electrode; substantially as described.

10. A battery comprising a plurality of dry cells each having a metal cap slipped over and insulated from the zinc element but connected to the carbon element, the cells being connected in series with the metal cap of one cell adjacent to and electrically connected with the other end of the next cell.

11. A battery comprising a plurality of dry cells each having a metal cap inclosing one end of the cell and insulated from the zinc element but connected with the carbon element, the cells being connected in series with the metal cap of one cell contacting with an exposed portion of the zinc electrode of an adjacent cell; substantially as described.

12. A battery comprising a plurality of dry cells each having a metal cap inclosing one end of the cell and insulated from the zinc element but connected with the carbon element, the cells being arranged in series with the metal cap of one cell soldered to the zinc element of the next cell.

13. A battery comprising a plurality of dry cells each having a metal cap slipped over and insulated from the zinc element but connected to the carbon element, the cells being arranged side by side and connected in series with the metal cap of one cell adjacent to and electrically connected with the other end of the next cell.

14. A battery comprising a plurality of dry cells each having a metal cap inclosing one end of the cell and insulated from the zinc element but connected with the carbon element, the cells being arranged side by side and connected in series with the metal cap of one cell contacting directly with an exposed portion of the zinc electrode of an adjacent cell.

15. A battery comprising a plurality of dry cells each having a metal cap inclosing one end of the cell and insulated from the zinc element but connected with the carbon element, the cells being arranged side by side and connected in series with the metal cap of one cell soldered to the zinc element of the next cell.

16. A battery comprising a plurality of dry cells each having a metal cap slipped over and insulated from the zinc element but connected with the carbon element, said cells being connected in series with the metal cap of one cell adjacent to and electrically connected with the other end of the next cell, a battery terminal attached to the metal cap at one end of the series of cells, the other terminal of the battery being connected to the zinc electrode at the opposite end of the series.

In testimony whereof I affix my signature.

CHARLES F. BURGESS.